Figure 1:
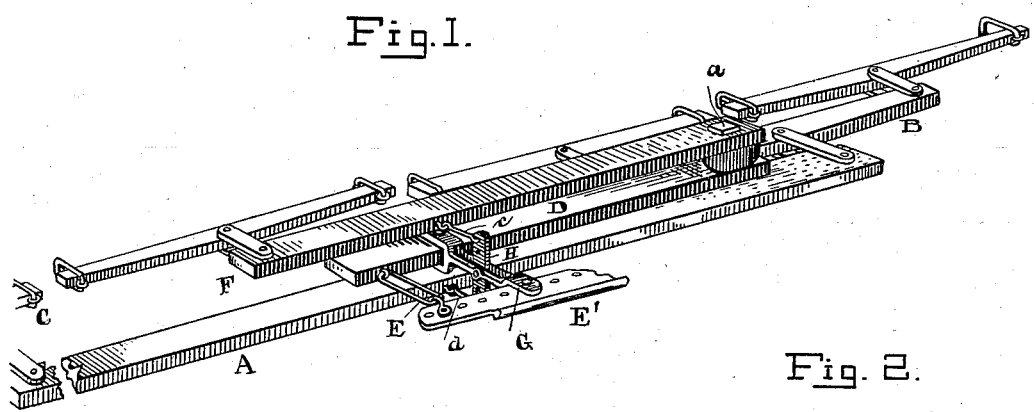

No. 651,810. Patented June 12, 1900.
J. H. RICHFORD.
DRAFT EQUALIZER.
(Application filed Feb. 6, 1899.)

(No Model.)

Witnesses.

Inventor
James H. Richford
By I. M. Thurlow
ATTY.

UNITED STATES PATENT OFFICE.

JAMES H. RICHFORD, OF PEORIA, ILLINOIS.

DRAFT-EQUALIZER.

SPECIFICATION forming part of Letters Patent No. 651,810, dated June 12, 1900.

Application filed February 6, 1899. Serial No. 704,760. (No model.)

*To all whom it may concern:*

Be it known that I, JAMES H. RICHFORD, a citizen of the United States, residing at Peoria, in the county of Peoria and State of Illinois, have invented certain new and useful Improvements in Draft-Equalizers; and I do hereby declare that the following is a full, clear, and exact description of the invention, which will enable others skilled in the art to which it appertains to make and use the same.

This invention relates to certain new and useful improvements in horse-power draft eveners or equalizers; and it consists, substantially, in such features of arrangement, construction, and combination of parts as will be hereinafter more particularly described.

Certain disadvantages have attended the use of draft eveners or equalizers as constructed and arranged heretofore owing to the fact that in most instances the point of attachment of the object to be drawn has with one or two exceptions, perhaps, been the center of the evener-bar, the tendency of which is to produce a lateral or side draft which is impossible to overcome except by the use of cumbersome and complicated devices. Furthermore, in the case of plowing, where the resistance offered by the plow is to one side of or at an angle to the line of draft, it is extremely difficult to maintain the plow in the direction it is intended the same shall follow, owing to the inequality of draft produced by the horse or team of horses at each end of the evener-bar. As the horses at each end of the evener-bar are hitched at equal distances from the point of attachment of the object drawn, it is evident that a thorough equalization of the draft or pulling force is almost impossible. In instances of plowing, say, with four horses to do the work properly and with the least strain upon the horses one horse should walk in the furrow and the other three on the unbroken ground to the side thereof. With the old construction and arrangement, however, the horses at each end of the evener-bar being at equal distances from the center of such bar renders it practically impossible to keep the horses in the positions or directions they should follow, and it will be found that the fourth horse will usually be crowded out of the furrow over onto where the previous furrow was turned. In this way the plowing is made very unsteady, which subjects the animals to great strain, besides exerting considerable wear and tear on the operative devices.

The object of the present invention is to overcome the objections mentioned and to provide a draft evener or equalizer embodying all the prerequisites to a perfectly-operating device and one also in which the several parts shall always be effective and reliable.

It is the purpose of my invention to provide a draft evener or equalizer in which four horses are preferably employed, although, as will more fully hereinafter appear, five horses could be employed equally as well, and then, again, if found desirable, three horses only need be employed.

The parts of my device or equalizer are so constructed and arranged as to be readily adjusted to the weight to be drawn and also to maintain the line of draft coincident with or parallel to the line of traction of the object drawn.

In carrying my invention into effect I provide the usual evener-bar, to one end of which a team of horses is hitched by means of the ordinary double and single trees, while to the opposite end thereof a single horse is hitched also by means of a singletree. Instead of attaching the plow or other object to be drawn to the center of the evener-bar I make the point of attachment thereof to one side of the center of such bar and provide an indirect connecting medium between it and the implement. In so far as I am able to ascertain no draft-equalizer has been provided with such connections as will be hereinafter fully described at length.

Figure 2:
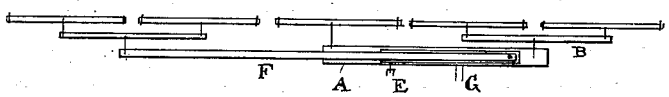
Figure 3:
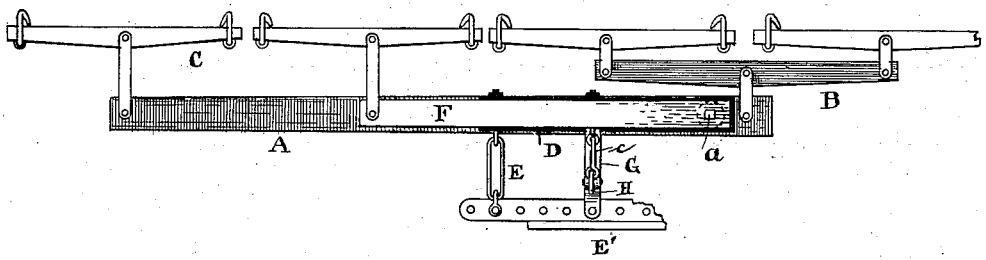
Figure 4:
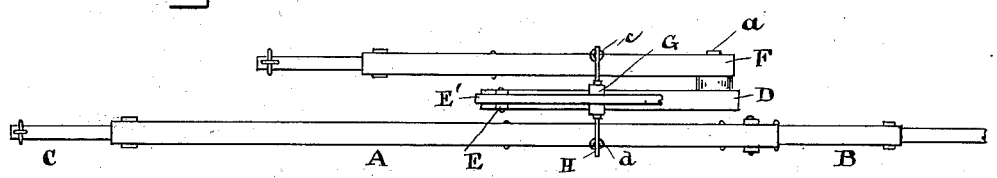
Figure 5:
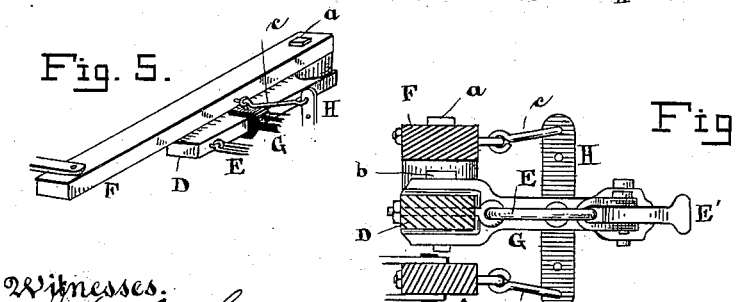
Figure 6:
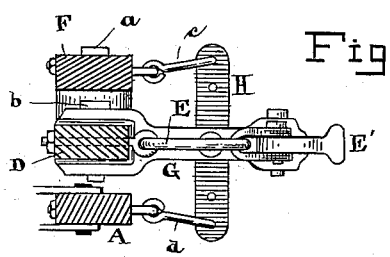

In the accompanying drawings, Figure 1 is a perspective view of my improved evener. Fig. 2 is a plan view of a slightly-modified form of the same device. Fig. 3 is a plan view of that shown in Fig. 1. Fig. 4 is a rear elevation of the equalizer, showing relative position of parts. Fig. 5 is a view in perspective of certain elements of my device. Fig. 6 is an end view of the evener in part section without the double and single trees.

In the various figures, A is the usual evener-bar employed in this class of devices. B is a doubletree attached to one end of such bar, and C is a singletree at the opposite end. Thus three horses may be hitched to the same bar. The point of connection of this bar with the plow is such that the single horse has a leverage twice that of the team at the doubletree—i. e., said point of connection is located at a point substantially one-third the length of the bar from one end—thereby giving the single horse twice the leverage allowed the team, the latter being hitched to the shorter end. This, however, is not new, but is explained to make my device clearly understood.

Attention may now be given the portions of the equalizer which I consider new.

Above the evener-bar A is a "draft-bar" D, as I term it, loosely connected at one end by a link or similar device E to the plow-clevis E'. At the opposite end is pivoted an auxiliary or supplemental bar or arm F at $a$. A draft rod or connection G is pivoted to the said clevis E', and its opposite end supports the said bar D by the bolt $b$ in Fig. 6. The said draft-rod G is provided with a slot to receive an upright lever H, the lower end of which has pivotal connection with the evener-bar A by a rod $c$. The upper end of the lever is similarly attached to the arm F at $c$, as shown. The points of connection of the draft-rod G and the rods $c$ and $d$ with the bars A and F are in a vertical line, as illustrated, though this is not important, since other means of connection could be employed. At the free end of the uppermost bar F is attached a singletree $f$. Fig. 2 shows how this bar may be extended from its pivotal point beyond the evener-bar A, so that two horses may be placed outside of the horse attached at C. In this manner five horses may be accommodated; but it is obvious that one horse may be used in place of the two and still have a four-horse evener. When the device is thus altered, the effect is to change the leverages somewhat. Therefore the point of connection with the plow-clevis must be shifted slightly to again bring about the proper conditions for perfect operation. Owing to the tendency of the plow to side draft the equalizer is attached to the plow in two places, as has been described. It is evident that when the evener-bar A is drawn forward the arm or bar F will natually be pulled backward by reason of the vertical lever H; but by extending the bar D considerably beyond its pivotal point at $b$ and pivoting upon such extension the arm F, as shown, and applying the power at the free end thereof the pull exerted by the horses upon the bar A will be equalized.

The following will give a clearer idea of the leverage and its equalizing effects. Assuming the entire device to be suspended by means of its draft-bar G and the connection E, if a weight of one hundred pounds be hung from the doubletree and fifty pounds from the singletree on the far end of the evener-bar A the leverage would be such that the fifty pounds would exactly balance the one hundred pounds. The combined weight of one hundred and fifty pounds will raise the arm F to its highest limit; but if fifty pounds is hung from the single-tree on the end of the said arm F that weight will be sufficient to return the arm to its first position, or the position shown in Fig. 3, thus proving that the pull of each of the four horses will be evenly distributed. The elements A, D, and F will be kept in an even line under a steady strain or without the jerky motion experienced in the operation of eveners in general.

A series of holes may be made in the several bars in the region of their pivotal points to provide means of adjustment, whereby, if required, the leverages may be altered.

I have shown and described my improved equalizer as I prefer to use it, but various changes may be made therein and still come within the scope of my invention.

An advantage in my evener is the use of the two connections between the evener-bar and the clevis—that is, the rod G and link E—whereby the plow is drawn forward in a perfectly-straight line or in a line free from noticeable side draft. Again, the vertical vibrating lever H, pivoted to the draft-rod G, by having connection with the arm F and evener-bar A in the manner shown and described every movement of the arm F is transmitted to the bar A, and vice versa, and the movement of one of the parts is balanced by the pull of the other. The lever is provided with suitable holes for adjustment of the rods $c$ and $d$ in order that greater or less leverage may be employed to suit the demand.

The particular arrangement of the lever H and its rods is not important, as any form or application of equivalent means may be used.

I may change the relative location of the bars A, D, and F and change the lengths of each when finding it expedient to do so. For example, the position of the bars A and F may be reversed—that is, the former may be placed above the bar D and the latter below such bar, and said bar D can be shortened and F lengthened to project, as indicated in Fig. 2, as before set forth. Evidently other changes of more or less importance may be made. While I have described the pivotal connection of the draft-bar with the object drawn as being located at a certain point in the length of said bar, it is not absolutely necessary to be placed exactly in the location shown and described. By extending the bar D beyond the horses at B and having suitable connection between the free end thereof and the pivotal connection with rod G for attachment to the lever H substantially the same results may be had as with the first form shown and described.

I claim—

1. In a draft-equalizer, a draft-bar having draft attachment for connection with the object drawn, a main evener-bar having indirect connection with said draft-bar above it, through the said draft attachment, an auxiliary arm pivoted at one end to the free end of said draft-bar, or at the end farthest removed from the said draft attachment, and pivotal connection between the said main evener and auxiliary arm through said attachment thereby having indirect connection between the draft-bar and the auxiliary arm except at the pivotally-connected ends thereof, and no connection between the said draft-bar and the main evener except through the said draft attachment, for the purposes set forth.

2. A draft-equalizer consisting of a main evener-bar, a draft-bar and an auxiliary or supplemental bar, or arm, a draft attachment between the draft-bar and the object drawn, a pivotal arm or lever on the draft attachment and connection between its lower end and the main bar and its upper end and the auxiliary bar, for the purposes specified, and pivotal connection between the auxiliary bar and the draft-bar substantially as set forth and described.

3. A draft-equalizer having a main evener-bar, a draft-bar above it, an auxiliary evener-bar above the draft-bar, pivotal connections between the two latter members, a draft attachment on the draw-bar, a vibrating lever pivoted on said attachment and connecting means between the said lever and the auxiliary bar and the lever and the main evener-bar, substantially as and for the purpose set forth and described.

4. In a draft-equalizer, a draft-bar, connecting means between it and the object drawn, said bar extending considerably beyond and at right angles to the connection means, an auxiliary bar above such draft-bar and having one end thereof pivoted to the said extension and the other end projecting beyond the draft end of said bar, a main evener below the draft-bar and suitable lever mechanism between the said evener-bar and the auxiliary bar, substantially as and for the purpose set forth and described.

5. In a draft-equalizer a draft-bar having draft attachments secured at one side of its middle length, a vibrating lever pivoted to one of such attachments, a main evener-bar below the draft-bar, suitable horse attachments thereon, said bar being connected with the lower end of said lever at a point about a third of the length of said bar from one end, an auxiliary evener-bar above the draft-bar, one end being pivoted to the free extended end of said draft-bar, the other extremity of said auxiliary bar projecting in the opposite direction beyond the draft connection and provided with horse attachments, said bar having connection with the upper end of the vibrating lever substantially as and for the purpose set forth and described.

6. In a draft-equalizer, a draft-bar D having a draft attachment near one end, at right angles to the length thereof, an auxiliary arm pivoted to such draft-bar at one end and having suitable horse attachment at its free end, such auxiliary arm having loose connection with one end of the pivotal lever, and a main evener-bar having loose connection with the opposite end of the pivotal lever and provided at each end with suitable horse attachment all for purposes set forth.

7. In a draft-equalizer, a draft-bar D having draft attachments E and G at one side of its middle length for connection with the object drawn, substantially as shown, a supplemental bar F above such draft-bar, one end thereof having pivotal connection with the free end of the latter, a main evener-bar A below the draft-bar, a vibrating lever pivoted on the draft attachment, a rod $d$ attached loosely to the said main evener-bar and the lower end of the lever, a rod $c$ attached loosely to the supplemental bar and the upper end of such lever and suitably-disposed horse attachments for the main evener-bar and the supplemental bar substantially as herein described and shown.

In testimony whereof I affix my signature in presence of two witnesses.

JAMES H. RICHFORD.

Witnesses:
 CHAS. WOLFE,
 A. KEITHLEY.